United States Patent [19]
Sherman

[11] 3,796,971

[45] Mar. 12, 1974

[54] LOW-PASS NON-LINEAR FILTER

[76] Inventor: Stanley A. Sherman, 46 Stoneleigh Rd., Trumbull, Conn. 06611

[22] Filed: Oct. 21, 1971

[21] Appl. No.: 191,180

[52] U.S. Cl. .................................... 333/17, 333/70
[51] Int. Cl. .............................................. H04b 3/04
[58] Field of Search ........................... 333/17, 18, 75

[56] References Cited

UNITED STATES PATENTS

| | | | |
|---|---|---|---|
| 3,278,866 | 10/1966 | Bose | 333/17 |
| 2,580,052 | 12/1951 | Torre et al. | 333/17 X |
| 3,529,244 | 9/1970 | Torick et al. | 333/18 X |
| 2,760,011 | 8/1956 | Berry | 333/75 X |
| 3,109,991 | 11/1963 | Ocko | 332/18 |

*Primary Examiner*—Eli Lieberman
*Assistant Examiner*—Saxfield Chatmon, Jr.
*Attorney, Agent, or Firm*—Rubens & Berger

[57] ABSTRACT

A non-linear filter for high and low frequency signals comprises means for separating and dissipating the high frequency out-of-band energy and passing the low frequency in-band energy. The filtering in a low-pass filter is achieved without phase shift both in- and out-of-band by use of conjugate high- and low-pass filters located before and after the dissipating means, respectively. A hard clipper is used to perform the dissipating function, and its reference clipping level is provided so that the maximum amplitude of the in-band signal arriving at the input to the clipper is slightly less than the clipping level. The output of the low-pass filter may be fed back to set the clipping level so that this level can track the in-band signal amplitude. A sensing resistor between the clipper and the means to set the clipping level senses the high frequency information and thus, the non-linear filter can serve as a high-pass filter with no phase shift when only the low-pass filter is used after the dissipating means.

17 Claims, 2 Drawing Figures

PATENTED MAR 12 1974 3,796,971

Inventor
Stanley A. Sherman

By: Peter L. Sege[illegible]
Attorney

LOW-PASS NON-LINEAR FILTER

BACKGROUND OF THE INVENTION

My invention relates to a filtering system, and more particularly, to a non-linear filter which is capable of serving as a low-pass and/or a high-pass filter.

The prior art is replete with linear filters exhibiting the well-known attenuation/phase shift characteristics as a function of frequency. These linear filters include low-pass and high-pass filters which pass low frequency and high frequency signals, respectively. The linear filters utilize reactive elements such as capacitors and inductors which store the out-of-band energy, and which is later returned to the circuit.

Phase shift accompanying the attenuation, although a generally accepted phenomenon, is quite undesirable in electrical circuits. The phase shift restricts the bandwidth of a circuit because of the amount of tolerable phase shift which can be accommodated. For instance, in feedback circuits, a phase shift approximating 180° causes the system to oscillate, and thus, the frequency band of a feedback loop including the linear filter, is significantly limited. With such feedback systems including linear filters, the rise time of the feedback loop is dependent upon the in-band frequency limits of the linear filter. By increasing the bandwidth within which no appreciable phase shift occurs, the stability of the loop increases, while the loop time response also decreases.

Through the well-known filtering process, prior art linear filters also improve the ratio of in-band to out-of-band electrical signals in accordance with conventional attenuation vs. frequency characteristics. Unfortunately, the "filtering" (that is, the attenuation of the out-of-band with respect to the in-band signals) obtained therewith is frequently insufficient to provide usable in-band signals.

SUMMARY OF THE INVENTION

An object of this invention is to provide an improved filter.

Another object of this invention is to provide such a filter which exhibits no phase shift with respect to frequency in and out of the desired band.

Another object of this invention is to provide such a filter which is suitable for use in a feedback circuit to improve the response time thereof.

Yet another object of this invention is to provide such a filter exhibiting improved "filtering" action.

Another object of this invention is to provide a method for filtering electrical waves which does not introduce phase shift inside or outside the in-band frequency.

Yet another object of this invention is to provide an improved method for filtering an electrical wave which exhibits improved properties as compared to linear filtering techniques.

Other objects, advantages and features of this invention will become more apparent from the following description.

In accordance with the principles of this invention, the above objects are accomplished by providing for an electrical wave, a method of separating lower frequency in-band energy from higher frequency out-of-band energy with approximately zero phase shift within and without the band comprises the steps of first emphasizing the higher frequency energy and then separating and dissipating the higher frequency out-of-band energy while deemphasizing and passing the in-band energy. For example, where the non-linear filter is used as a low-pass filter, the input electrical wave, which consists of both low in-band and high out-of-band frequency signal components, is connected through a high-pass linear filter which emphasizes the high frequency component with respect to the lower frequency signal. The emphasized input electrical wave is connected to the separating and dissipating means which can be a hard clipper through an amplitude-setting amplifier. The output of the clipper is connected through an isloating amplifier to a low-pass linear filter, which further attenuates the high-frequency component while passing the low-frequency information. The high-pass and low-pass linear filters are conjugate, thereby introducing zero phase shift in-band and out-of-band to an electrical signal passing through my filter system.

As another feature of my invention, the "filtering" action is even further enhanced by connecting the output of the low-pass filter to the level setting input of the clipper. This ensures that the clipper level tracks the low frequency amplitude levels. If the output of the low-pass linear filter is not connected to the level setting input of the clipper, then the clipper level is set to be slightly greater than the maximum amplitude of the attenuated lower frequency in-band signal applied to the input of the clipper.

In either case, the level set for the clipper ensures that the high frequency component will pass through the clipper, thus separating the high and low frequency components. Of great significance is the fact that this separation is accomplished, in part, through the use of the clipper which dissipates, rather than stores, the high frequency component.

When my non-linear filter is used as a high-pass filter, the high frequency or out-of-band component is sensed by a sensing means, such as a low valued sensing resistor connected between the level setting means and the clipping level input of the clipper. Since the clipping level is such as to separate the high from the low frequency components, the high frequency component passes through clipper and the sensing resistor to be dissipated. As is apparent, when my invention is used as a high-pass filter, the in-band signal can be considered to be the higher frequency components, while the out-of-band signal is that of the lower band. The high-pass filter embodiment of my invention is also capable of separating out the high frequency component without any phase shift. This is accomplished by omitting the linear high-pass filter and directly coupling the input electrical wave directly to the clipper. Thus, when separated, the high-frequency component will not have encountered any phase shift, and the high-frequency component is produced across the sensing resistor.

DETAILED DESCRIPTION

Figure 1:
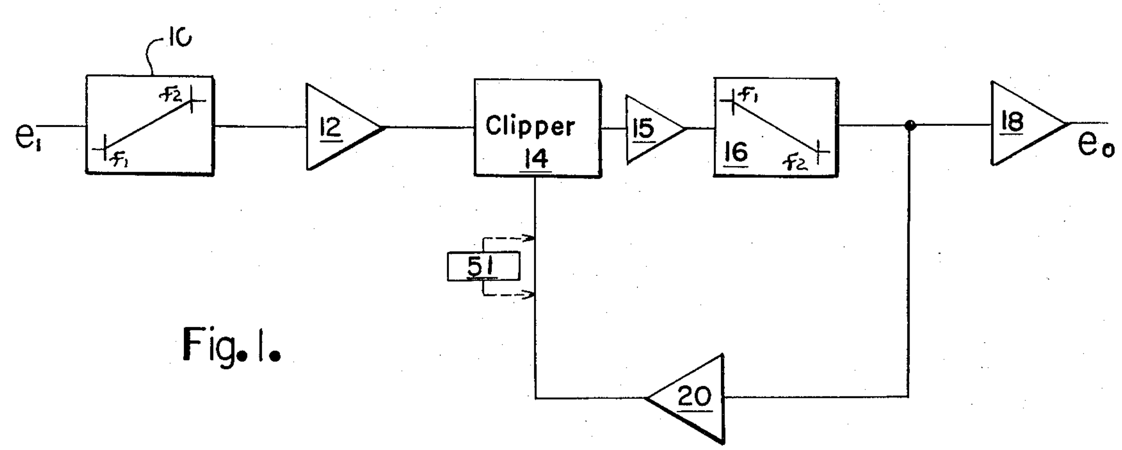
FIG. 1 is a block diagram of an embodiment of a non-linear filter in accordance with my invention.

Referring to the FIGURES, and in particular to FIG. 1, there is shown a high-pass linear filter 10 having an input receiving an electrical wave. The input signal may be assumed to contain the desired electrical information contained between a desired frequency band from zero to $f_1$ Hz, as illustrated in FIG. 1. In filter 10, the high-frequency or out-of-band energy of the input signal is emphasized, while the desired in-band information is attenuated. The output of the high-pass filter 10 is passed through a wide-band buffer amplifier 12 which adjusts the amplitude of the output of the high-pass filter 10 so that the amplitude required for satisfactory clipping required by clipper 14 is produced. The output of buffer amplifier 12 is supplied to the input of a separation and dissipating means, such as a hard clipper 14, the output of which is supplied through a wideband buffer amplifier 15 to a low-pass filter 16 having conjugate characteristics as compared with high-pass filter 10.

The output of low-pass linear filter 16 is supplied through a wideband buffer amplifier 18 which produces the filtered electrical wave without a phase shift either inside or outside the desired band. Amplifiers 12 and 15, preferably, are wideband amplifiers having a bandwidth significantly greater than the desired in-band frequency range, and amplifier 15 ensures that the clipper 14 does not load filter 16 to change its characteristics. This permits both the in-band and out-of-band frequency to be amplified without being phase shifted in the amplifiers. Additionally, buffer amplifiers 12 and 15 should operate in their linear modes so as to prevent the introduction of a time delay caused by amplifier recovery time in my non-linear filter. Although the phenomenon is not fully understood, it has been found that the attenuation of out-of-band noise with respect to the inband signal is significantly greater than that previously obtainable. A possible explanation resides in the dissipation of the out-of-band component after its separation rather than the conventional storage of this component.

As will be explained below, this "filtering" action is even further improved by coupling the output of the low-pass filter 16 to a level setting input of hard clipper 14, so that the clipping level tracks the output signal level. The output of low-pass filter 16 is connected through an amplifier 20 to the level setting input of the clipper. In this embodiment, the combined gain of amplifiers 15 and 20 approaches but is less than unity to ensure that the clipping level of the hard clipper is approximately at the output level of the low-pass filter 16 without feedback oscillation. This enables the emphasized out-of-band component to be clipped so the total signal plus noise remains within a small envelope that tracks the in-band signal. The output impedance of amplifier 20, preferably, is low so as to enable the clipper to operate properly. Preferably, amplifier 20 is wideband having bandwidth significantly greater than the desired in-band frequency range so that the signal at the level-setting input to hard clipper 14 has virtually no phase shift with respect to the output of low-pass filter 16.

It may be seen that the high-pass linear filter 10 emphasizes the out-of-band high-frequency component which is separated from the low-frequency component, clipped and dissipated in clipper 14. By dissipating the out-of-band high frequency component, and by using conjugate high-pass and low-pass filters 10 and 16, respectively, no phase shift is introduced within or without the desired low frequency band when my invention is used as a non-linear low-pass filter.

When my invention is used as a non-linear low-pass filter, the above description may be seen to encompass three distinct embodiments. As a first embodiment, the non-linear low-pass filter will comprise high-pass linear filter 10, amplifier 12, clipper 14, buffer amplifier 15, low-pass linear filter 16 and feedback amplifier 20. In this first embodiment, the most significant "filtering" improvement is found coupled with the lack of a phase shift within and without the low frequency band, when filters 10 and 16 are conjugate.

As a second embodiment, the high-pass linear filter 10 may be omitted thus still providing the significantly improved "filtering" action, although a phase shift will be experienced by the low frequency component as it passes through the filter 16.

As a third embodiment, the high-pass linear filter 10 is retained, but the feedback path to set the clipping level is omitted, with the clipping level being independently preset as described above. In this embodiment, no phase shift is experienced within or without the low frequency band, and the "filtering" action is still significantly better than that found in the prior art, although not as good as the first embodiment described above.

It has been further discovered that the above-described non-linear filter also can be advantageously employed as a high-pass non-linear filter by providing a current sensing means 50 (as indicated by the phantom lines in FIGS. 1 and 2) connected between the level sensing input of clipper 14 and the means to set the clipping level, such as amplifier 20. The clipper 14 functions to separate the out-of-band high-frequency component from the in-band low-frequency component and passes the high frequency component through the current sensing means 50. In this embodiment, the in-band signal can be considered to be the high-frequency component of the input electrical wave applied to the input of high-pass linear filter 10. To achieve the non-linear high-pass "filtering" action without phase shift, the high-pass linear filter 10 is omitted, and the input electrical wave is directly supplied to amplifier 12. Thus, when the high frequency component passes through the clipper 14, it has undergone no phase shift. This improved non-linear high-pass filter also functions to provide improved "filtering" action and is capable of doing so without phase shift within or without the higher frequency band. This non-linear high-pass filter can be effectively employed with all three embodiments set forth above. In particular, with the first embodiment, current sensing means 50 is connected between the output of amplifier 20 and the level setting input of clipper 14. In this embodiment, significant improvement in the "filtering" action is obtained, although phase shift is encountered within the high frequency band since it is passed through high-pass linear filter 10.

In the second embodiment, current sensing means 50 is similarly connected between the output of amplifier 20 and the level setting input of clipper 14. In this embodiment, the improved "filtering" action obtained above is also present, but omission of high-pass filter 10 permits the high frequency component to experience no phase shift.

In the third embodiment, current sensing means 50 is connected between the means which presets the clipping level and the clipping level input of the clipper 14.

In this embodiment, phase shift is experienced in the high-frequency band since the input electrical wave passes through high-pass filter 10. The "filtering" action obtained, although much improved over the prior art, is not as significant as that experienced above with the first and second embodiments.

Figure 2:
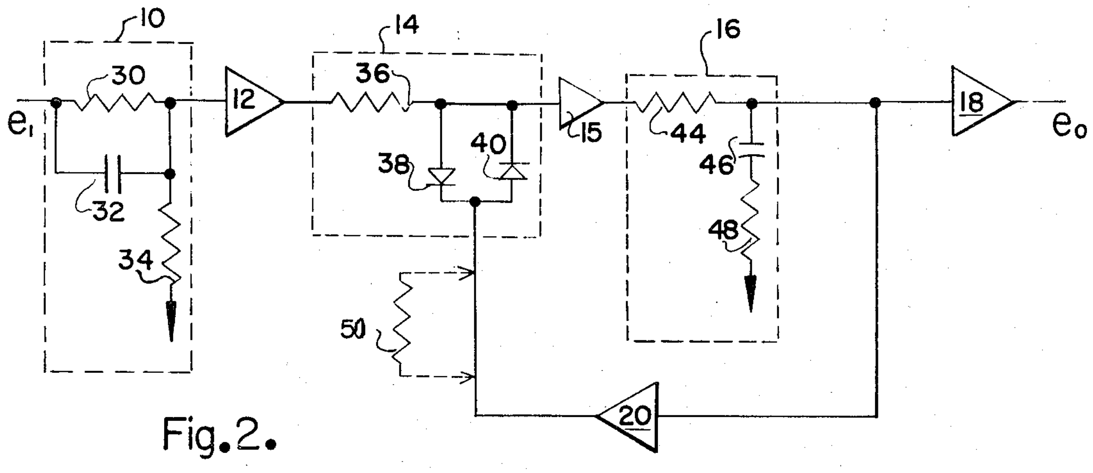
FIG. 2 is a schematic diagram of an embodiment of the non-linear filter illustrated in FIG. 1.

Referring now to FIG. 2, there is shown a schematic diagram of an embodiment of my invention illustrated in FIG. 1, in which the high-pass linear filter is illustrated as comprising a resistor 30, a parallel capacitor 32 and a resistor 34 connected to a source of reference potential or ground. One end of resistor 30 is connected to receive the input electrical wave, while the other end of resistor 30 is connected through resistor 34 to the reference potential or ground and through a conventional amplifier 12, preferably having a wideband and operating in the linear mode.

The output of amplifier 12 is supplied to hard clipper 14, which is illustratively shown as having a resistor 36 and a pair of diodes 38 and 40. One end of resistor 36 is connected to the output of wideband amplifier 12, while the other end is connected to the anode and cathode of diodes 38 and 40, respectively. The other ends of diodes 38 and 40 are connected together and to the output of feedback amplifier 20 or to ground or to a reference potential.

The output of clipper 14 is connected through buffer amplifier 15, to the low-pass linear filter 16 comprising a resistor 44, capacitor 46 and resistor 48. One end of resistor 44 is connected to the output of amplifier 15, while the other end of resistor 44 is connected through capacitor 46 and resistor 48 to a source of reference potential or ground. Amplifier 15 serves as a buffer amplifier and has a low output impedance so as not to load down filter 16 and change its characteristics.

The output of filter 16 is connected through wideband amplifier 18 and also is supplied through feedback amplifier 20 to set the clipping level for clipper 14. For effective clipping, amplifier 20 should have low output impedance.

The method employed in obtaining the improved filtering action comprises separating the out-of-band high-frequency component from the low-frequency component and dissipating the out-of-band energy. This separation and dissipation is accomplished in clipper 14 and, by tying the clipping level to the output of the low-pass linear filter 16 through amplifier 20, an improved signal to noise characteristic is obtained. This is due to the clipping level tracking the desired output level. If the clipper level were set independently, then the improvement in the signal to noise ratio obtained wound not be as great. Further, by using conjugate filters 10 and 16 with the non-linear low-pass filter, the phase shift introduced to the input electrical waveform due to the high-pass filter 10 is eliminated through the conjugate low-pass filter 16.

When my non-linear filter is to be used as a high-pass filter, the current sensing means 50 is connected between the level setting input of clipper 14 and the means to set this level. With reference to FIG. 2, current sensing means 50 may comprise a resistor 50 (shown with phantom lines) which has a low value, such as ten ohms. The low value for resistor 50 ensures that the separation and dissipation functions of the clipper 14 are not impaired. The above description of the non-linear high-pass filter with reference to FIG. 1 will not again be repeated, as it is understood that such description is clearly applicable to the schematic diagram of FIG. 2 and the three embodiments described thereof with reference to FIG. 1.

It has been found that my non-linear filter whether used as a high-pass or low-pass filter provides unusual and astounding performance and is particularly useful for almost all filtering operations, and particularly where stability and bandwidth are important. In feedback circuits, the bandwidth can be increased by several orders of magnitudes, and the rise time similarly decreased due to the zero phase shift encountered through this non-linear filter. The bandwidth of the feedback system can be extended greatly by using my non-linear filter without in any way interfering with the stability of the loop. It should further be noted that the method employed in this invention may be conveniently performed on conventional digital computers with the steps of the method simulated in the computer.

It will thus be seen that the objects set forth above, among those made apparent from the preceding description, are efficiently attained, and, since certain changes may be made in the apparatus, (such as using non-linear filters for filters 10 and 16), and the steps in carrying out the above method without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

I claim:

1. Apparatus for frequency separation of an electrical wave having low frequency and high frequency components comprising a clipper having an input, output and a level setting input, a high-pass filter having an input and an output, said input of said high-pass filter receiving said electrical wave, said output of said high-pass filter connected to said input of said clipper, a low-pass filter having an input and output, said input of said low-pass filter connected to the output of said clipper, a second amplifier means serving as an amplifier the output of said low-pass filter means being coupled through said second amplifier to said level setting input of said clipper means to instantaneously set said clipping level responsive to the magnitude of the low frequency components, said clipping level comprising a fixed bias level and superimposed thereon the low frequency components produced at the output of said low-pass filter means, and said high-pass and low-pass filters being conjugate.

2. Apparatus as set forth in claim 1, comprising first, and third amplifier means each having an input and an output, said input of said third amplifier means being connected to the output of said high-pass filter, said output of said third amplifier means being connected to said input of said clipper, said output of said clipper being connected through said first amplifier to said input of said low-pass filter.

3. Apparatus as set forth in claim 2, wherein said first, second and third amplifier means operate in their linear modes.

4. Apparatus as set forth in claim 2, wherein said first, second and third amplifier means are wideband amplifiers.

5. Apparatus as set forth in claim 2, wherein said low-pass and high-pass filters are conjugate.

6. Apparatus as set forth in claim 2, wherein said first and second amplifier means have low output impedances.

7. Apparatus as set forth in claim 2, wherein said clipper is a hard clipper.

8. Apparatus as set forth in claim 2, wherein the combined amplitude gain between the output of the clipper and the level setting input of said clipper is less than unity.

9. Apparatus as set forth in claim 1, comprising current sensing resistor means connected to said dissipating means for sensing the high frequency components.

10. Apparatus as set forth in claim 9, comprising first amplifier means having an input and output, said output of said clipper means connected to said low-pass filter means through said first amplifier means, said output of said second amplifier means being connected to said level sensing input of said clipper through said current sensing resistor means.

11. Apparatus as set forth in claim 10, wherein said first and second amplifier means have low output impedances.

12. Apparatus as set forth in claim 10, comprising a high-pass filter with said electrical wave connected to said input of said clipper through said high-pass filter.

13. For an electrical wave having low frequency and high frequency components, a method of separating said components comprising the steps of controlling a clipping level, clipping said high frequency components while passing said low frequency components, emphasizing said passed low frequency components with respect to any passed high frequency components, and instantaneously tracking said emphasized, passed low frequency components with said clipping level to instanteously set the clipping level in response to the magnitude of low frequency components for separating said high frequency from said low frequency components.

14. A method as set forth in claim 13, comprising the step of sensing said high frequency components after said clipping step.

15. A method as set forth in claim 13, comprising the step of emphasizing said high frequency components prior to said clipping step.

16. A method as set forth in claim 15, comprising the steps of phase shifting said electrical wave equal and opposite amounts during said steps of emphasizing said high frequency components and emphasizing said passed low frequency components to achieve zero phase shift.

17. A method as set forth in claim 16, comprising the step of sensing said high frequency components after said clipping step.

* * * * *